United States Patent
Belshan et al.

(10) Patent No.: US 10,871,227 B1
(45) Date of Patent: Dec. 22, 2020

(54) POWER END OF A PUMP

(71) Applicant: Black Horse, LLC, Houston, TX (US)

(72) Inventors: Daryl Belshan, Tremont, IL (US);
Jacob Brown, Waller, TX (US);
Zhaoxu Dong, Dunlap, IL (US);
Wenming Zhao, Dunlap, IL (US);
Mark J. Carls, Spring, TX (US)

(73) Assignee: BLACK HORSE, LLC, Houston, TX (US)

( * ) Notice: Subject to any disclaimer, the term of this patent is extended or adjusted under 35 U.S.C. 154(b) by 0 days.

(21) Appl. No.: 16/778,962

(22) Filed: Jan. 31, 2020

(51) Int. Cl.
| | |
|---|---|
| *F16J 1/08* | (2006.01) |
| *F04B 39/12* | (2006.01) |
| *F16M 1/024* | (2006.01) |
| *F01M 1/06* | (2006.01) |
| *F16H 57/04* | (2010.01) |
| *F01B 9/02* | (2006.01) |
| *F04B 1/053* | (2020.01) |
| *F04B 39/14* | (2006.01) |
| *F01M 1/08* | (2006.01) |
| *F16H 7/04* | (2006.01) |

(52) U.S. Cl.
CPC .................. *F16J 1/08* (2013.01); *F01B 9/02* (2013.01); *F01B 9/026* (2013.01); *F01M 1/06* (2013.01); *F04B 1/053* (2013.01); *F04B 39/128* (2013.01); *F16H 57/04* (2013.01); *F16M 1/024* (2013.01); *F01M 2001/083* (2013.01); *F04B 39/14* (2013.01); *F16H 7/04* (2013.01)

(58) Field of Classification Search
CPC ........... F16M 1/024; F16H 7/04; F16H 57/04; F16H 57/05; F04B 1/053; F04B 39/128; F04B 39/14; F01B 9/02; F01B 9/023; F01B 9/026; F01B 1/02; F01M 1/06; F01M 2001/083; F16J 1/08; F02F 7/0007; F02F 7/0021; F02F 7/065
USPC ........................................... 184/6.8
See application file for complete search history.

(56) References Cited

U.S. PATENT DOCUMENTS

| | | | | |
|---|---|---|---|---|
| 2,012,009 | A * | 8/1935 | Hobart | F02F 7/0053 184/13.1 |
| 2,081,224 | A * | 5/1937 | Hanson | F04B 17/04 92/80 |
| 2,239,853 | A * | 4/1941 | Lource | F04B 1/00 92/261 |
| 2,331,513 | A * | 10/1943 | Stahl | F04B 53/00 92/73 |
| 2,681,054 | A * | 6/1954 | Boghossian | F01M 11/02 123/195 R |
| 2,907,309 | A * | 10/1959 | Kolbe | F01M 13/0033 123/41.86 |
| 9,702,359 | B2 * | 7/2017 | Kerr | E21B 43/121 |
| 2004/0035375 | A1 * | 2/2004 | Gibisch | B22D 19/0009 123/41.74 |
| 2015/0315994 | A1 * | 11/2015 | Quinton | B22D 29/001 123/195 R |

(Continued)

*Primary Examiner* — Charles G Freay
(74) *Attorney, Agent, or Firm* — MH2 Technology Law Group LLP

(57) ABSTRACT

A frame includes a rib. The frame also includes a crosshead tube that is integral with the rib. The frame also includes a lube rail that is integral with the rib, the crosshead tube, or both. The frame also includes a nose plate that is integral with the rib, the crosshead tube, the lube rail, or a combination thereof.

18 Claims, 14 Drawing Sheets

(56) References Cited

U.S. PATENT DOCUMENTS

2016/0177945 A1* 6/2016 Byrne ............... F04B 53/18
 184/6
2017/0370524 A1* 12/2017 Wagner ............. F16N 13/02

* cited by examiner

POWER END OF A PUMP

BACKGROUND

Hydraulic fracturing is a well-stimulation technique in which a high-pressure fluid is injected downhole to fracture a subterranean rock. More particularly, hydraulic fracturing involves injecting a high-pressure fluid into a wellbore to create cracks in the rock through which hydrocarbons (e.g., natural gas, petroleum, etc.) may flow into the wellbore more freely. The injected fluid may be pressurized by a pump at the surface. The pump may be, for example, a reciprocating pump that includes a power end and a fluid end. The power end converts rotational energy/motion into reciprocating energy/motion.

The power end includes a frame that includes a plurality of metallic pieces that are coupled (e.g., welded) together. The frame is exposed to cyclical forces during the conversion from rotational energy/motion to reciprocating energy/motion. The cyclical forces generate areas of high stress in the frame, particularly proximate to the weld lines. More particularly, the forces proximate to the weld lines can lead to stress risers and fatigue, which may be exacerbated by poor process quality, poor penetration, blow-through, etc. Further, welds are inherently weak in fatigue. Over time, these stressed/fatigued areas of the frame and welds may reach their fatigue limit and begin to crack. As the cracks propagate, this may lead to the end of the useful life of the power end of the pump. Thus, what is needed is an improved power end of a pump that is more resistant to cracks and thus has a longer useful life.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A frame is disclosed. The frame includes a rib. The frame also includes a crosshead tube that is integral with the rib. The frame also includes a lube rail that is integral with the rib, the crosshead tube, or both. The frame also includes a nose plate that is integral with the rib, the crosshead tube, the lube rail, or a combination thereof.

A single-piece cast frame is also disclosed. The frame includes a rib having a varying thickness. The frame also includes a crosshead tube that is integral with the rib. A first transition exists between the rib and the crosshead tube, and a size of the first transition is from about 0.1 inches to about 3.0 inches. The frame also includes a lube rail that is integral with the rib, the crosshead tube, or both. The frame also includes a nose plate that is integral with the rib, the crosshead tube, the lube rail, or a combination thereof. The nose plate varies in thickness. A second transition exists between the rib and the nose plate, and a size of the second transition is from about 0.1 inches to about 3.0 inches. The rib, the crosshead tube, the lube rail, and the nose plate are cast together in a mold.

A single-piece cast frame for a power end of a pump is also disclosed. The frame includes a crankshaft bearing support. The frame also includes a rib that is integral with the crankshaft bearing support. A first radius is defined between the crankshaft bearing support and the rib, and the first radius is from about 0.5 inches to about 20 inches. The rib includes a first portion and a second portion. The first portion of the rib is thicker than the second portion of the rib. The first portion of the rib has a thickness from about 2.5 inches to about 8.0 inches, and the second portion of the rib has a thickness from about 0.5 inches to about 5.0 inches. The frame also includes a crosshead tube that is integral with the rib. A second radius is defined between the rib and the crosshead tube, and the second radius is from about 0.1 inches to about 3.0 inches. The frame also includes a lube rail that is integral with the rib, the crosshead tube, or both. The frame also includes a nose plate that is integral with the rib, the crosshead tube, the lube rail, or a combination thereof. A third radius is defined between the rib and the nose plate, and the third radius is from about 0.1 inches to about 3.0 inches. The nose plate includes a first portion and a second portion. The first portion of the nose plate is thicker than the second portion of the nose plate. The first portion of the nose plate has a thickness from about 1.0 inch to about 12.0 inches, and the second portion of the nose plate has a thickness from about 0.25 inches to about 3.0 inches. The first portion of the nose plate is aligned with the rib, and the second portion of the nose plate is not aligned with the rib. The rib, the crosshead tube, the lube rail, and the nose plate are cast together in a mold, and none of the rib, the crosshead tube, the lube rail, and the nose plate are welded together.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying figures. In the following detailed description, numerous specific details are set forth in order to provide a thorough understanding of the present disclosure. However, it will be apparent to one of ordinary skill in the art that the system and method disclosed herein may be practiced without these specific details.

Figure 1:
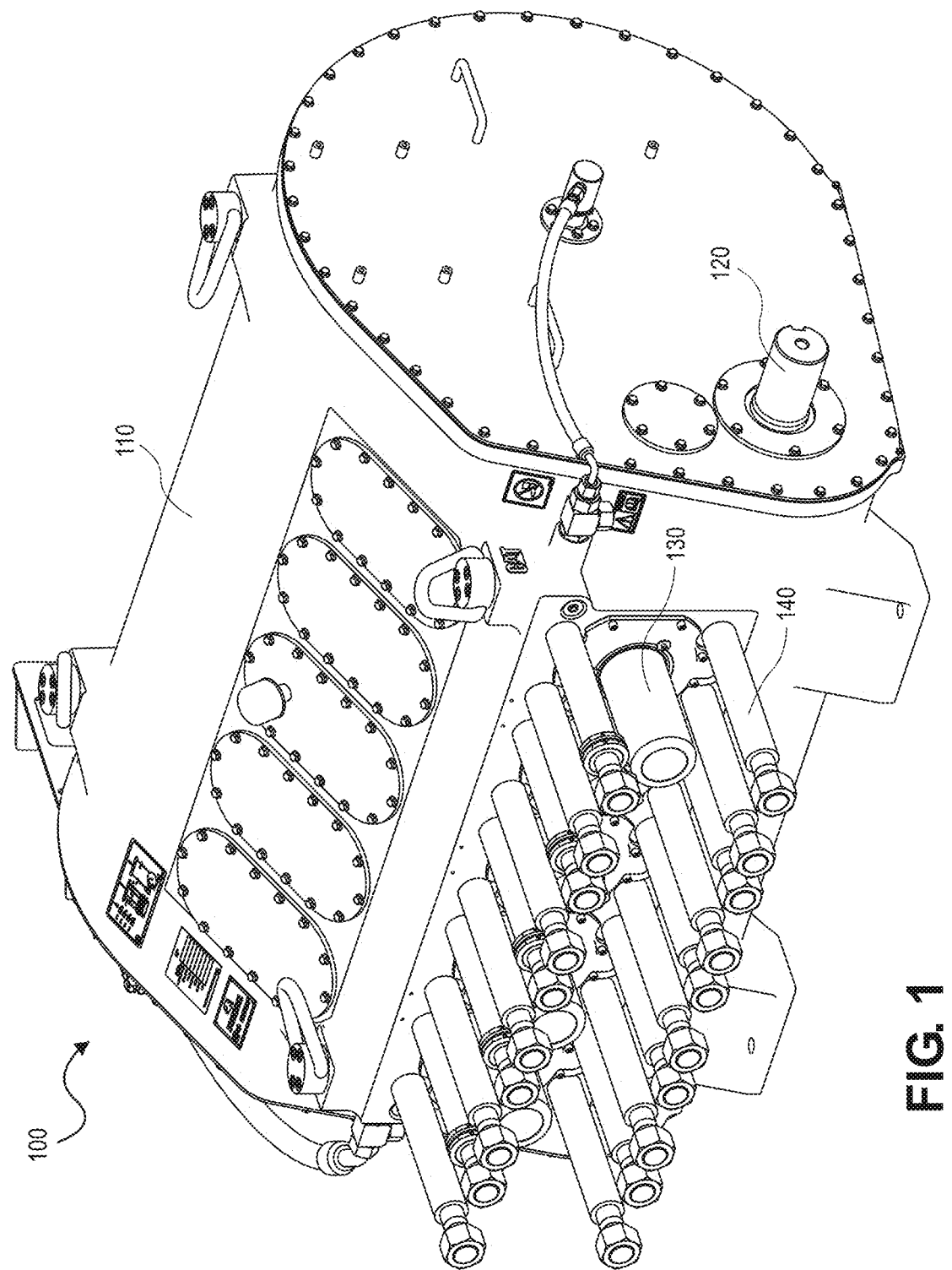
FIG. 1 illustrates a perspective view of a power end of a pump, according to an embodiment.
Figure 2:
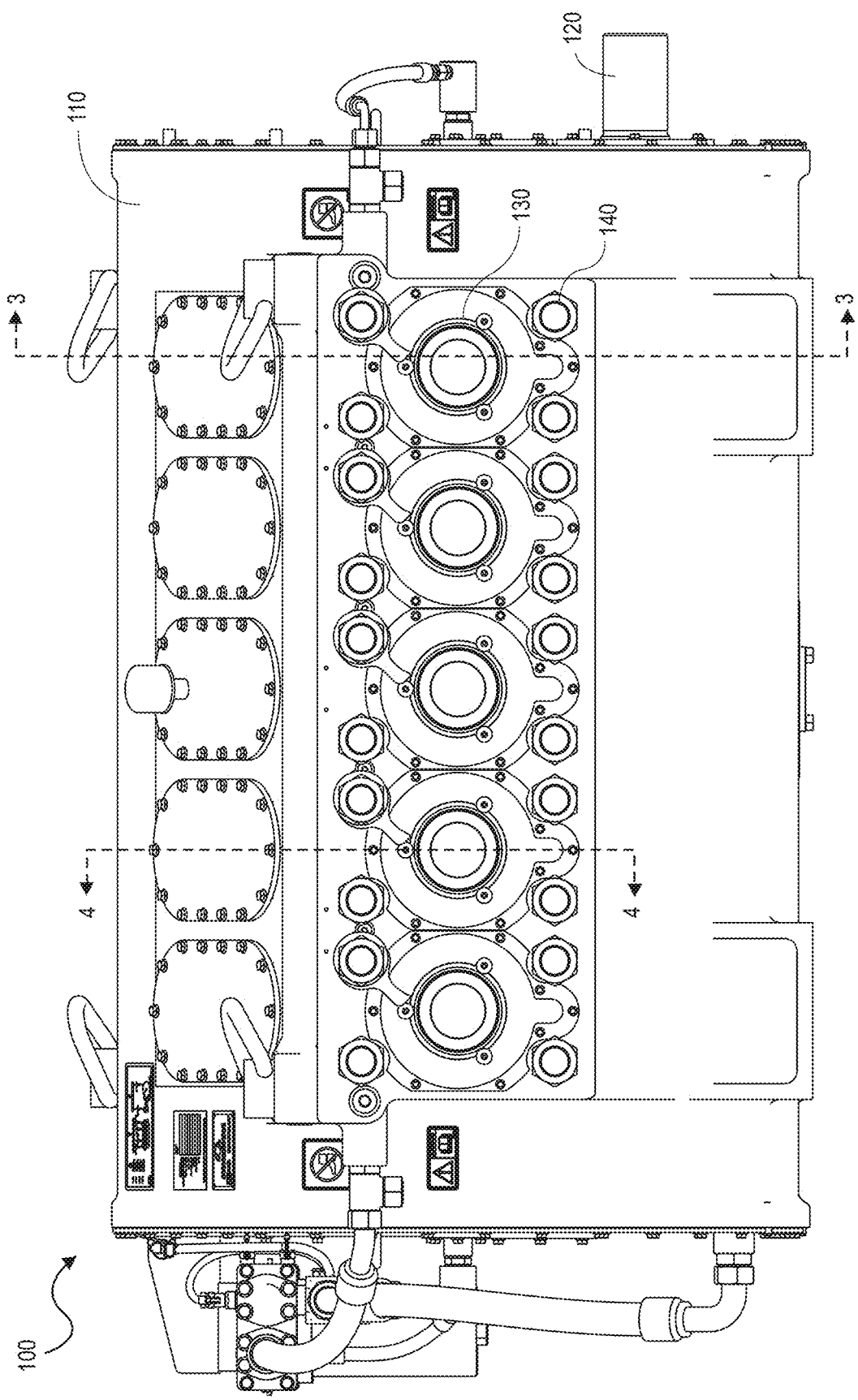
FIG. 2 illustrates a front view of the power end, according to an embodiment.

FIG. 1 illustrates a perspective view of a power end 100 of a pump, and FIG. 2 illustrates a front view of the power end 100 of the pump, according to an embodiment. The power end 100 may include a frame 110. The frame 110 may be made of cast metal (e.g., ductile iron, gray iron, cast steel, etc.). The frame 110 may be manufactured by a casting process whereby the metal, in liquid form, is poured into a mold. The liquid metal then cools and solidifies, resulting in the frame 110, which may be or include a single (e.g., integral) component. Thus, the frame 110 may be referred to as a single-piece cast frame. As used herein, two or more portions of the frame 110 are integral with one another if they are formed together at the same time (e.g., as part of a casting process). Thus, as used herein, two or more portions are not integral with one another if they are welded together.

As a result of being a single-piece cast frame, the areas of the frame 110 that are exposed to stress during the use/operation of the power end 100 may not include any coupling (e.g., welding). As will be appreciated, areas of the frame 110 that are not exposed to stress during the use of the power end 100 may have components, such as tags and adapters, coupled (e.g., welded) thereto. In contrast, conventional frames include multiple steel plates that are coupled (e.g., welded) together. These steel plates may be coupled (e.g., welded) together in areas of the frame that are exposed to stress during the use/operation of the power end. As described in greater detail below, the frame 110 described herein may experience lower stress levels than conventional welded frames, particularly in the areas where the conventional frames are welded together. Further, because the frame 110 avoids welding, it is stronger in fatigue. As a result, the frame 110 described herein may have a longer useful life than conventional welded frames.

The power end 100 may also include an input drive shaft (also referred to as a pinion) 120. The input drive shaft 120 may extend through the frame 110 (e.g., from an exterior of the frame 110 to an interior of the frame 110). The portion of the input drive shaft 120 that is exterior to the frame 110 may be connected to a motor or transmission (not shown), which may cause the input drive shaft 120 to rotate.

The power end 100 may also include one or more pony rods (five are shown: 130). The pony rods 130 may extend through the frame 110. As described in greater detail below, the power end 100 may convert the rotational motion of the input drive shaft 120 to reciprocating (e.g., linear) motion of the pony rods 130. The portions of the pony rods 130 that are exterior to the frame 110 may be connected to a fluid end of the pump (not shown).

The power end 100 may also include one or more stay rods and sleeves (twenty are shown: 140). The stay rods and sleeves 140 may extend into the frame 110. The stay rods and sleeves 140 may be stationary and serve to couple the power end 100 to the fluid end.

Figure 3:
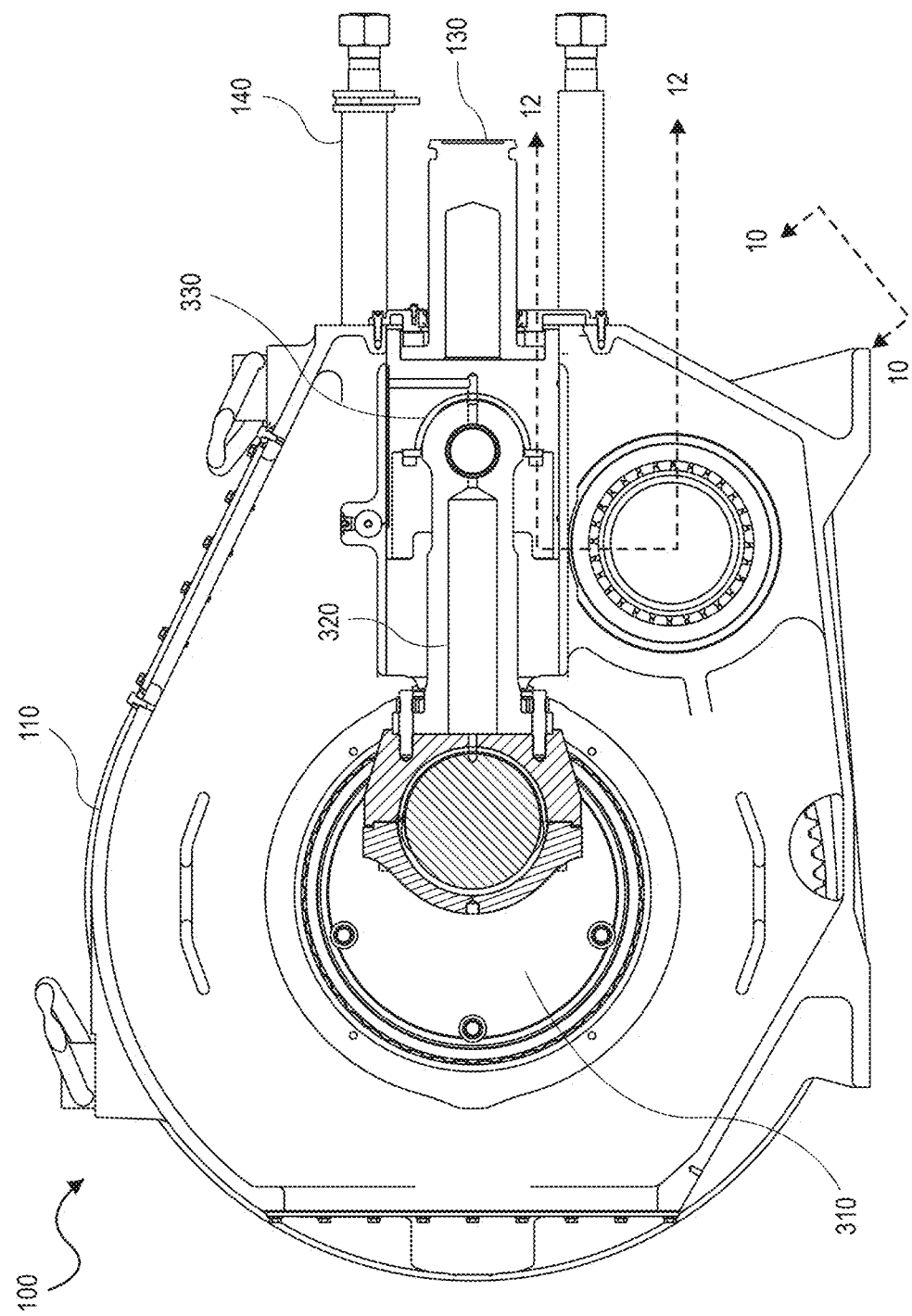
FIG. 3 illustrates a cross-sectional side view of the power end taken through line 3-3 in FIG. 2, according to an embodiment.

FIG. 3 illustrates a cross-sectional side view of the power end 100 taken through line 3-3 in FIG. 2, according to an embodiment. The power end 100 may include one or more crankshafts (one is shown: 310). The crankshaft 310 may be positioned at least partially within the frame 110. The crankshaft 310 may be coupled to the input drive shaft 120 (the input drive shaft 120 is shown in FIGS. 1 and 2). The crankshaft 310 may convert the rotational motion of the input drive shaft 120 to reciprocating (e.g., linear) motion.

The power end 100 may also include one or more connecting rods (one is shown: 320) and one or more crossheads (one is shown: 330). The connecting rod 320 and/or the crosshead 330 may be positioned at least partially within the frame 110. The connecting rod 320 may be coupled to and positioned at least partially between the crankshaft 310 and the crosshead 330. The reciprocating (e.g., linear) motion may be transferred from the crankshaft 310 to the crosshead 330 via the connecting rod 320. The crosshead 330 may be coupled to one or more of the pony rods 130 and may thus cause the pony rods 130 to move (e.g., reciprocate) back and forth, as mentioned above with reference to FIGS. 1 and 2.

Figure 4:
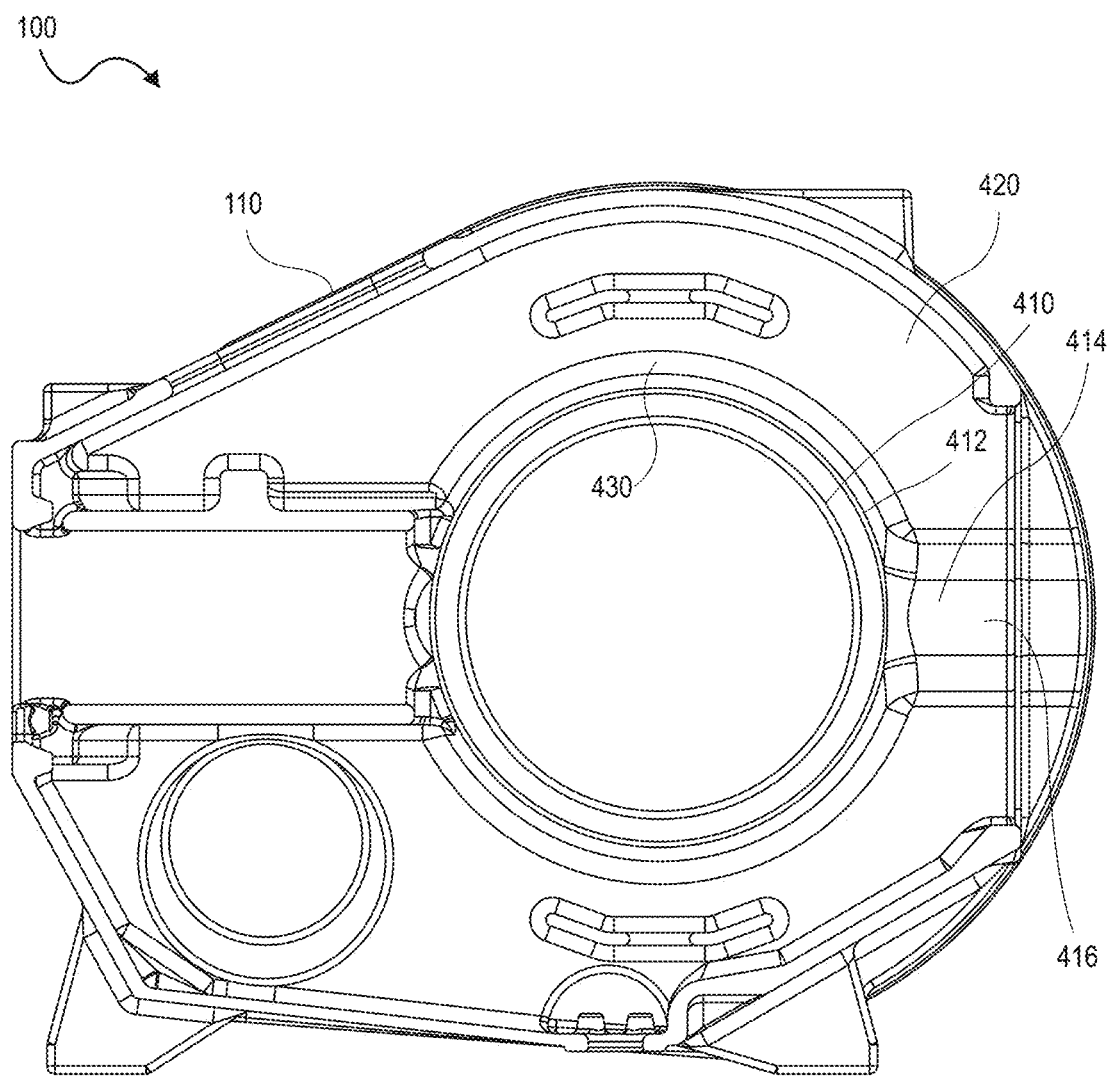
FIG. 4 illustrates a cross-sectional side view of the power end taken through line 4-4 (with the internal components removed and without machining), in FIG. 2, according to an embodiment.

FIG. 4 illustrates a cross-sectional side view of the power end 100 taken through line 4-4 in FIG. 2 (with the internal components removed), according to an embodiment. The frame 110 may also include a crankshaft bearing support 410 that is positioned at least partially around and/or configured to support the crankshaft 310 (see FIG. 3). The frame 110 may also include one or more ribs (one is shown: 420) that is/are integral with the crankshaft bearing support 410. The rib 420 may extend outward from and/or at least partially surround the crankshaft bearing support 410.

The intersection between the crankshaft bearing support 410 and the rib 420 may have a larger transition 430 than conventional welded frames. As used herein, a transition may be or include a fillet, a bevel, a chamfer, or a radius that is integral with the two portions (e.g., the crankshaft bearing support 410 and the rib 420) that it is positioned between. The transition may not be or include a weld. For example, the transition may be formed during the cast molding of the frame 110. The transition may be curved, or it may be substantially planer and oriented at an angle (e.g., 45 degrees) to the two portions (e.g., the crankshaft bearing support 410 and the rib 420) that it is positioned between. When the transition is a fillet, a bevel, or a chamfer, a size of the transition may be or include a width, a thickness, or a height.

As mentioned above, the intersection between the outer surface 412 of the crankshaft bearing support 410 and the surface of the rib 420 may have a larger transition (e.g., radius) 430 than conventional welded frames. The transition 430 may be from about 0.5 inches to about 20.0 inches, about 5.0 inches to about 16.0 inches, or about 10.0 inches to about 14.0 inches. For example, the transition 430 may be about 12.34 inches. The larger (in comparison to the conventional welded frame) transition 430 may reduce stress during the operation of the power end 100, allowing the frame 110 to experience less stress than the conventional welded frame.

In addition, a rear 414 of the crankshaft bearing support 410 may be thicker than conventional welded frames. The thickness 416 may be from about 2.0 inches to about 5.0 inches, about 2.5 inches to about 4.0 inches, or about 2.75 inches to about 3.5 inches. For example, the thickness 416 may be about 3.0 inches. The thickness 416 may be at the location of reference number 416 and extend into and out of the page in FIG. 4.

Figure 5:
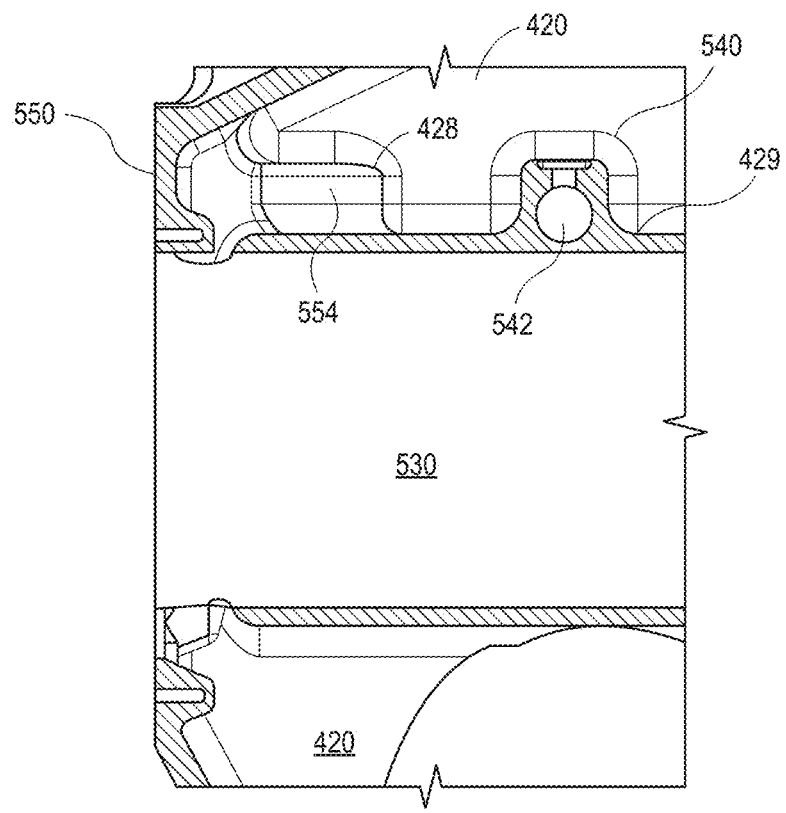
FIG. 5 is an enlarged portion of FIG. 4 (with machining), according to an embodiment.
Figure 6:
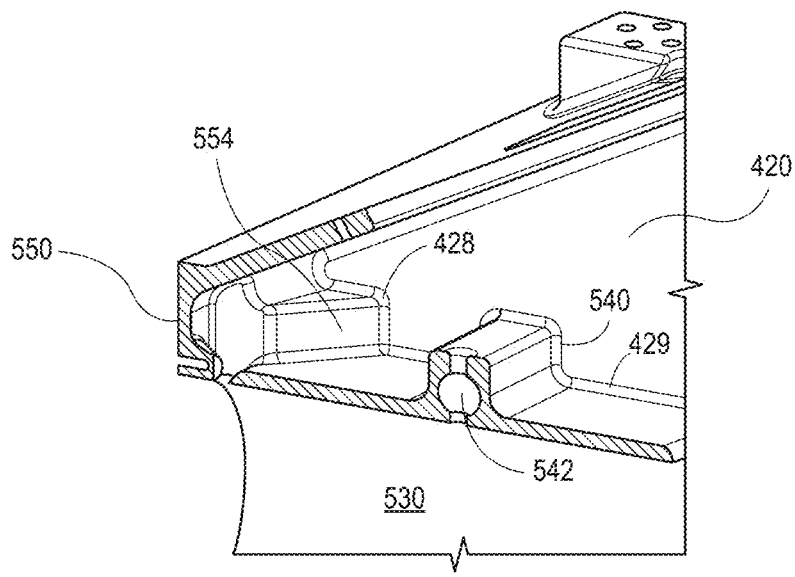
FIG. 6 is a cross-sectional perspective view of FIG. 5 (with machining), according to an embodiment.

FIG. 5 is an enlarged portion of FIG. 4 (the left side of FIG. 4), and FIG. 6 is a perspective view of the portion shown in FIG. 5, according to an embodiment. FIG. 4 is shown without machining, and FIGS. 5 and 6 are shown with machining. The frame 110 may include the rib 420, as discussed above. The frame 110 may also include a crosshead tube 530 that is integral with the rib 420. Although not shown, the crosshead tube 530 may have the crosshead 330 positioned at least partially therein. The frame 110 may also include a lube rail 540 that is integral with the rib 420, the crosshead tube 530, or both. The lube rail 540 may define an opening 542 through the rib 420 through which lubricating fluid (e.g., oil) may flow. The frame 110 may also include a nose plate 550 that is integral with the rib 420, the crosshead tube 530, or both. The nose plate 550 may serve as a support that the stay rods and sleeves 140 extend into and/or through, and a positional stop for the stay rods and sleeves 140. In addition, the nose plate 550 may provide a surface for sealing components to mate to in order to prevent debris from penetrating into the frame 110 or lubrication fluid from flowing out of the frame 110. As described in greater detail below, at least a portion of the nose plate 550 may be thicker to provide (additional) support for one or more of the stay rods and sleeves 140 (shown in FIGS. 1 and 2). This portion is referred to as a stay rod support 554.

As mentioned above, the rib 420 may be integral with nose plate 550. For example, the rib 420 may be integral with the stay rod support 554. The intersection between the rib 420 and the nose plate 550 (e.g., the stay rod support 554) may have a larger transition (e.g., radius) 428 than conventional welded frames. The transition 428 may be from about 0.1 inches to about 3.0 inches, about 0.5 inches to about 2.0 inches, or about 0.65 inches to about 1.0 inch. For example, the transition 428 may be about 0.78 inches. In contrast, the rib of the conventional welded frame may be a plate that is welded to the nose plate. Thus, there may be no transition between the rib and the nose plate in the conventional welded frame. The transition 428 may reduce stress during the operation of the power end 100, allowing the frame 110 to experience less stress than the conventional welded frame.

In addition, the rib 420 may be integral with the crosshead tube 530. The intersection between the rib 420 and the crosshead tube 530 may have a larger transition (e.g., radius) 429 than conventional welded frames. The transition 429 may be from about 0.1 inches to about 3.0 inches, about 0.5 inches to about 2.0 inches, or about 0.65 inches to about 1.0 inch. For example, the transition 429 may be about 0.78 inches. In contrast, the rib of the conventional welded frame may be a plate that is welded to the crosshead tube. Thus, there may be no transition between the rib and the crosshead tube in the conventional welded frame. The transition 429 may reduce stress during the operation of the power end 100, allowing the frame 110 to experience less stress than the conventional welded frame.

Figure 7A:
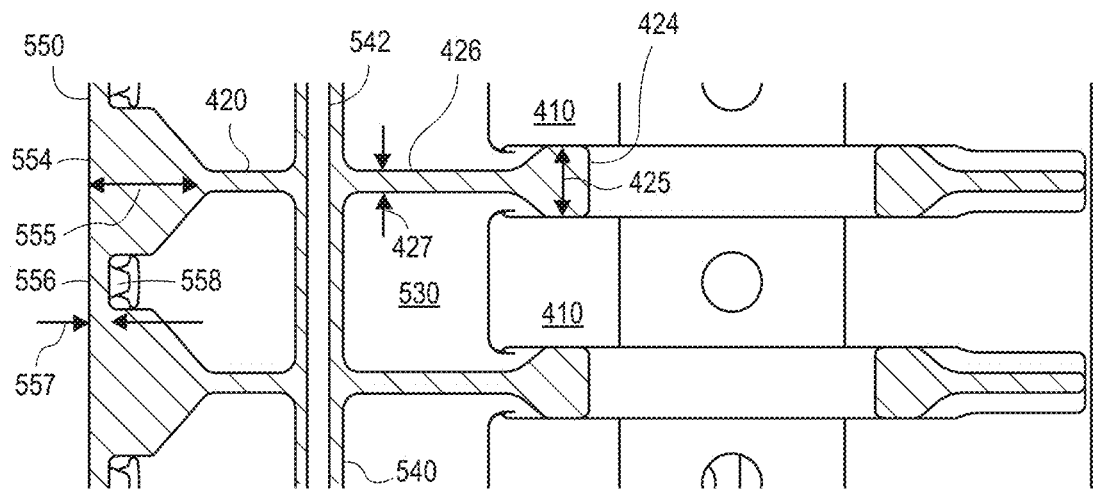
FIG. 7A is a cross-sectional view from the top of a portion of FIGS. 5 and 6, according to an embodiment.
Figure 7B:
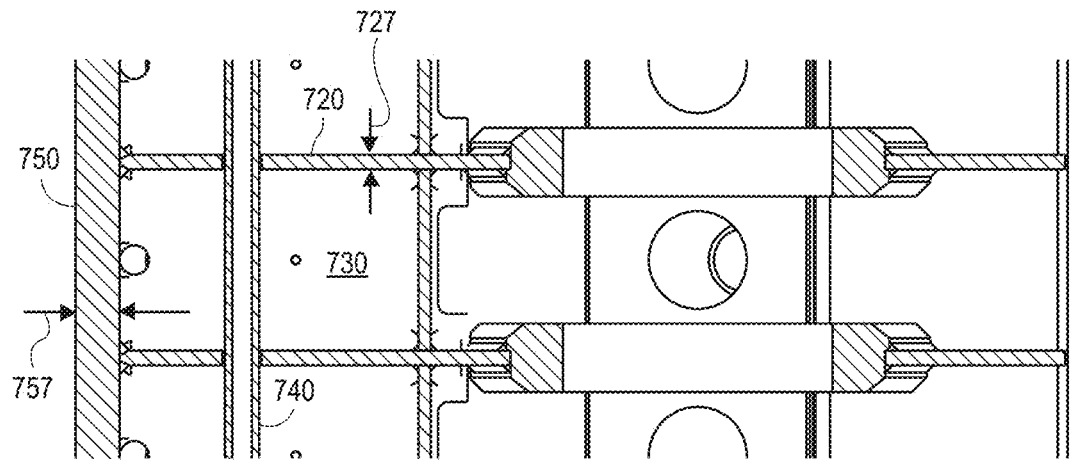
FIG. 7B is a corresponding cross-sectional view from the top of a portion of a conventional welded frame of a power end, according to an embodiment.

FIG. 7A is a cross-sectional view from the top of a portion of FIGS. 4 and 5, and FIG. 7B is a corresponding view of a conventional welded frame of a power end, according to an embodiment. More particularly, FIG. 7A is a top view of the rib 420, the crosshead tube 530, the lube rail 540, and the nose plate 550, and FIG. 7B is a corresponding view of a rib 720, a crosshead tube 730, a lube rail 740, and a nose plate 750 of a conventional welded frame. The portions of the frame 110 in FIG. 7A may have different thicknesses and transitions (e.g., radii), when compared to the corresponding portions of the conventional welded frame in FIG. 7B, to provide additional structural support in areas that experience greater stress and to reduce weight in areas that experience lesser stress.

The rib 420 may vary in thickness. For example, the rib 420 may have a thicker first portion 424 that transitions a thinner second portion 426. The first portion 424 may be integral with the crankshaft bearing support(s) 410. The rib 420 and the crankshaft bearing support(s) 410 may both be part of the single-piece cast frame 110. The first portion 424 may experience a greater load/stress than the second portion 426 due to the crankshaft 310. In one embodiment, the first portion 424 may have a thickness 425 from about 2.5 inches to about 8.0 inches, about 3.0 inches to about 6.0 inches, or about 3.5 inches to about 5.0 inches. For example, the first portion 424 may have a thickness 425 of about 4.26 inches.

The second portion 426 may be positioned between the first portion 424 and the lube rail 540. As shown, the second portion 426 may not be positioned at least partially between the crankshaft bearing supports 410. As a result, the second portion 426 may experience a lesser load/stress than the first portion 424. In one embodiment, the second portion 426 may have a thickness 427 from about 0.5 inches to about 5.0 inches, about 0.75 inches to about 3.0 inches, or about 0.9 inches to about 2.0 inches. For example, the second portion 426 may have a thickness 427 of about 1.0 inch. In contrast, the rib 720 of the conventional welded frame in FIG. 7B may be a plate having a constant thickness 727 of about 0.75 inches. As will be appreciated, the rib 420 with the varying thickness 425, 427 may provide greater structural support in areas that experience greater stress during the operation of the power end 100, allowing the frame 110 to experience less stress than the conventional welded frame.

The nose plate 550 may also vary in thickness. The nose plate 550 may have a first portion (also referred to as the stay rod support) 554 and a second portion 556. The first portion 554 may be integral and aligned with one of the ribs 420. The first portion 554 may also be positioned closer to the stay rods and sleeves 140 than the second portion 556. For example, the first portion 554 may be in contact with and/or configured to support one or more of the stay rods and sleeves 140. As a result, the first portion 554 may experience a greater stress than the second portion 556 due to the stay rods and sleeves 140. In one embodiment, the first portion 554 may have a thickness 555 from about 1.0 inch to about 12.0 inches, about 1.5 inches to about 10.0 inches, or about 2 inches to about 8 inches. For example, the first portion 554 may have a thickness 555 of about 6.26 inches.

The second portion 556 may be positioned between adjacent first portions 554 and/or between adjacent ribs 420. The second portion 556 may not be in contact with one or more of the stay rods and sleeves 140. As a result, the second portion 556 may experience a lesser stress than the first portion 554. In one embodiment, the second portion 556 may have a lesser thickness than the first portion 554. The second portion 556 may have a thickness 557 from about 0.25 inches to about 3.0 inches, about 0.5 inches to about 2.0 inches, or about 0.8 inches to about 1.5 inches. For example, the second portion 556 may have a thickness 557 of about 1.0 inch. In contrast, the nose plate 750 of the conventional welded frame shown in FIG. 7B may be a plate having a constant thickness 757 of about 2.25 inches. As will be appreciated, the nose plate 550 with the varying thickness 555, 557 may provide greater structural support in areas that experience greater stress during the operation of the power end 100, allowing the frame 110 to experience less stress than the conventional welded frame.

In addition, the nose plate 550 may include thicker extrusions 558 for threaded holes. The extrusions 558 may allow blind, threaded holes to be placed on the surface of the nose plate 550 without creating a through-hole through which oil may flow out. Additionally, the extrusions 558 may only add material directly around the threaded hole to reduce the weight. The extrusions 558 may have a thickness from about 0.25 inches to about 3.0 inches, about 0.5 inches to about 2.75 inches, or about 1.0 inch to about 2.5 inches. Conventional frames, without the ability to vary the thickness of the nose plate 750, either have shallower threaded holes, which may not provide enough thread engagement, or through-holes, which may allow oil to exit the frame.

The frame 110 may also include or define an integrated lubrication system. The lubrication system may provide lubrication to the moving components (e.g., the bearings of the input drive shaft 120, the bearings of the crankshaft 310, the bearings of the connecting rod 320, the crosshead 330, or a combination thereof). The lubrication system may include a single inlet to receive a lubrication fluid (e.g., oil). The lubrication system may also include a plurality of flowpaths (e.g., opening 542 in lube rail 540) that are defined at least partially by the inner surface of the frame 110. Having a single inlet and flowpaths that are defined by the frame 110 may minimize the number of parts used within the frame 110 and also reduce the likelihood of leaks. In contrast, conventional welded frames do not define the flowpaths; rather, conventional welded frames have pipes, hoses, and connections therein that provide the flowpaths. These pipes, hoses, and connections may represent more parts within the power end that may fail and require replacement. In addition, the additional connections between the pipes and hoses in the conventional welded frame increase the number of areas where leaks may occur.

Figure 8A:
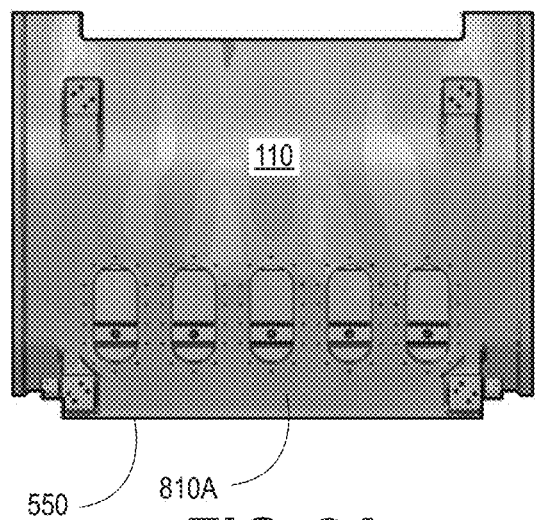
FIG. 8A illustrates a top view of a frame of the power end showing stresses in different portions thereof, according to an embodiment.
Figure 8B:
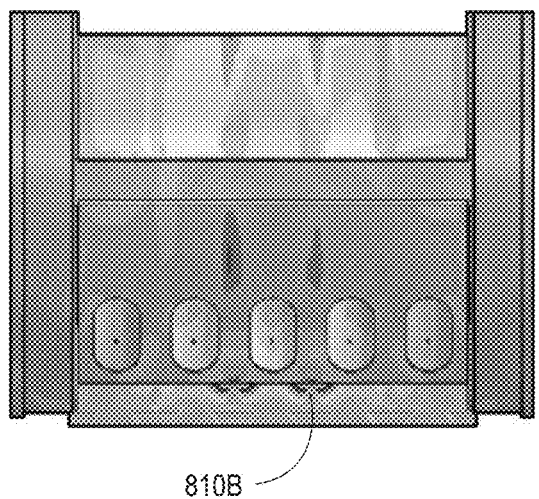
FIG. 8B illustrates a corresponding top view of a conventional welded frame of a power end showing stresses in different portions thereof, according to an embodiment.

FIG. 8A illustrates a finite element analysis (FEA) of a top view of the frame 110 showing stresses in different portions thereof, and FIG. 8B illustrates a FEA of a corresponding top view of a conventional welded frame showing stresses in different portions thereof, according to an embodiment. The maximum stress 810A seen in FIG. 8A is less than about 80 MPa, less than about 60 MPa, less than about 40 MPa, or less than about 20 MPa. This maximum stress 810A is proximate to the top of the nose plate 550 and the rib 420, where the stay rod 140 extends into the frame 110. In the particular example shown in FIG. 8A, the maximum stress is 13 MPa.

The maximum stress 810B in FIG. 8B is 90 MPa and occurs in the same corresponding location with the same loading conditions. As mentioned above, the frame 110 in FIG. 8A may have lesser stress levels than the conventional frame in FIG. 8B at least in part due to being a single, cast-molded component rather than multiple components coupled (e.g., welded) together, having greater thicknesses in areas that experience greater stress levels, having transitions rather than welded joints, or a combination thereof. More particularly, the frame 110 in FIG. 8A may have lesser stress levels due to the thicker rib 420, the larger transition 429 between the rib 420 and crosshead tube 530, and the large stay rod support 554 that distributes the load from the stay rod 140 into the mating components better.

Figure 9A:
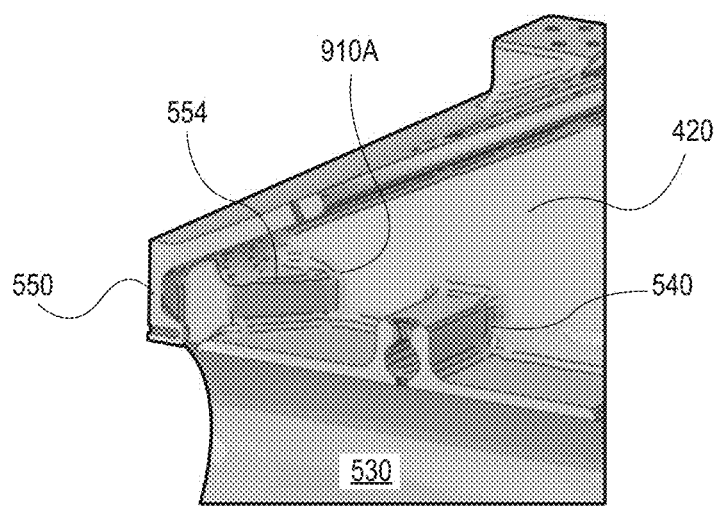
FIG. 9A illustrates a cross-sectional perspective view of FIG. 5 showing stresses in different portions thereof, according to an embodiment.
Figure 9B:
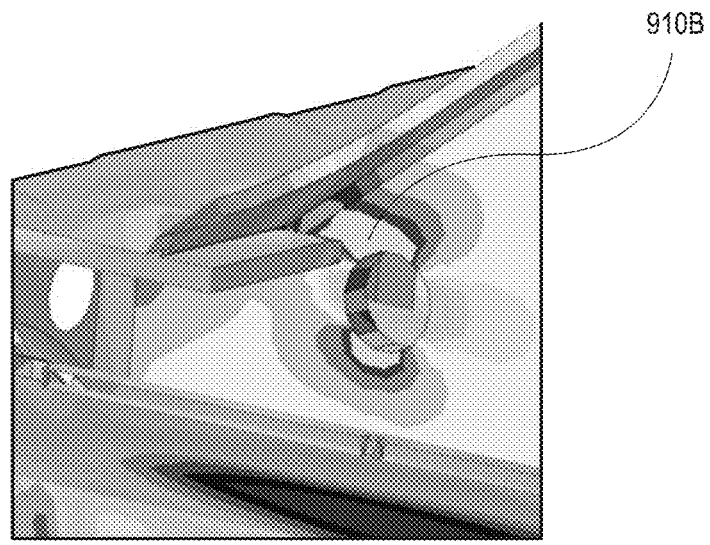
FIG. 9B illustrates a corresponding cross-sectional perspective view of the conventional welded frame showing stresses in different portions thereof, according to an embodiment.

FIG. 9A illustrates a FEA of a cross-sectional perspective view of FIG. 5 showing stresses in different portions thereof, and FIG. 9B illustrates a FEA of a corresponding cross-sectional perspective view of the conventional welded frame showing stresses in different portions thereof, according to an embodiment. As will be appreciated, FIG. 9A is the same view shown in FIG. 6, with the addition of FEA data showing stress levels. As shown in the FEA in FIG. 9A, the maximum stress 910A occurs proximate to the rib 420, the nose plate 550, and/or the stay rod support 554 of the frame 110. More particularly, the maximum stress 910A occurs proximate to the transition 428 between the rib 420 and the stay rod support 554. The maximum stress 910A is less than about 80 MPa, less than about 60 MPa, less than about 40 MPa, or less than about 20 MPa. In the particular example shown in FIG. 9A, the maximum stress is 20 MPa.

The maximum stress 910B in FIG. 9B also occurs proximate to the rib 720 and/or nose plate 750 of the frame. The maximum stress 910B is 90 MPa. As mentioned above, the frame 110 in FIG. 9A may have lesser stress levels than the conventional frame in FIG. 9B at least in part due to being a single, cast-molded component rather than multiple components coupled (e.g., welded) together, having greater thicknesses in areas that experience greater stress levels, having transitions rather than welded joints, or a combination thereof. More particularly, the frame 110 in FIG. 9A may have lesser stress levels at least partially due to the transition 428 (see FIG. 5) and the thickness 555 (see FIG. 7A).

Figure 10A:
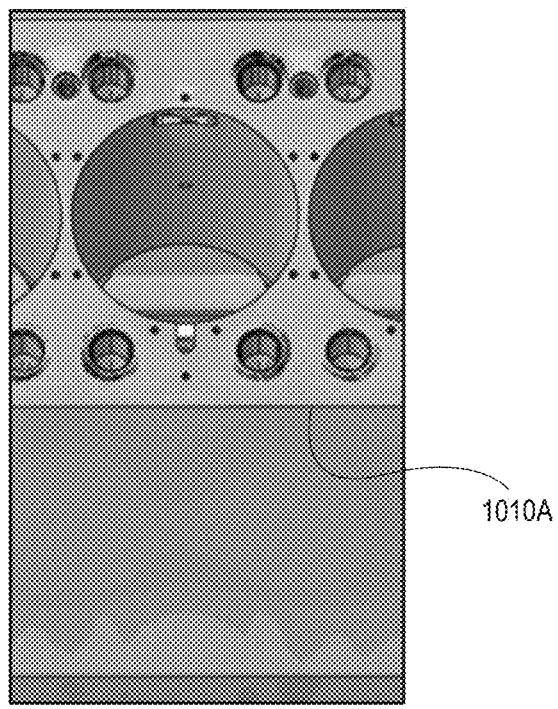
FIG. 10A illustrates a view of the frame taken along line 10-10 in FIG. 3 showing stresses in different portions thereof, according to an embodiment.
Figure 10B:
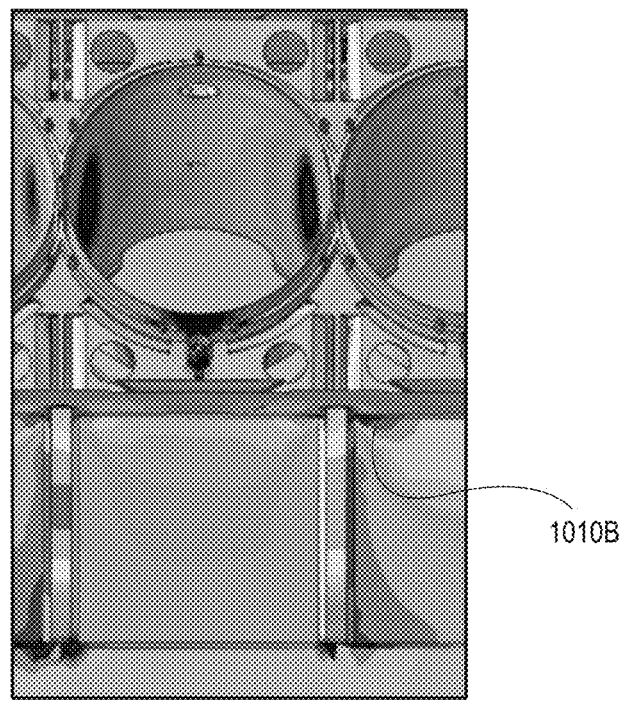
FIG. 10B illustrates a corresponding cross-sectional view of the conventional welded frame showing stresses in different portions thereof, according to an embodiment.

FIG. 10A illustrates a view of the frame 110 taken along line 10-10 in FIG. 3 showing stresses in different portions thereof, and FIG. 10B illustrates a corresponding cross-sectional view of the conventional welded frame showing stresses in different portions thereof, according to an embodiment. As shown in the FEA in FIG. 10A, the maximum stress 1010A occurs proximate to the bottom of the nose plate 550 and the rib 420, close to where the stay rod 140 extends into the frame 110. The maximum stress 1010A is less than about 80 MPa, less than about 60 MPa, less than about 40 MPa, or less than about 20 MPa. In the particular example shown in FIG. 10A, the maximum stress is 7 MPa.

The maximum stress 1010B in FIG. 10B is 60 MPa and occurs in the same corresponding location. As mentioned above, the frame 110 in FIG. 10A may have lesser stress levels than the conventional frame in FIG. 10B at least in part due to being a single, cast-molded component rather than multiple components coupled (e.g., welded) together, having greater thicknesses in areas that experience greater stress levels, having transitions rather than welded joints, or a combination thereof. More particularly, the frame 110 in FIG. 10A may have lesser stress levels due to the thicker rib 420, the larger transition 429 between the rib 420 and crosshead tube 530, and the large stay rod support 554 that distributes the load from the stay rod 140 into the mating components better.

Figure 11:
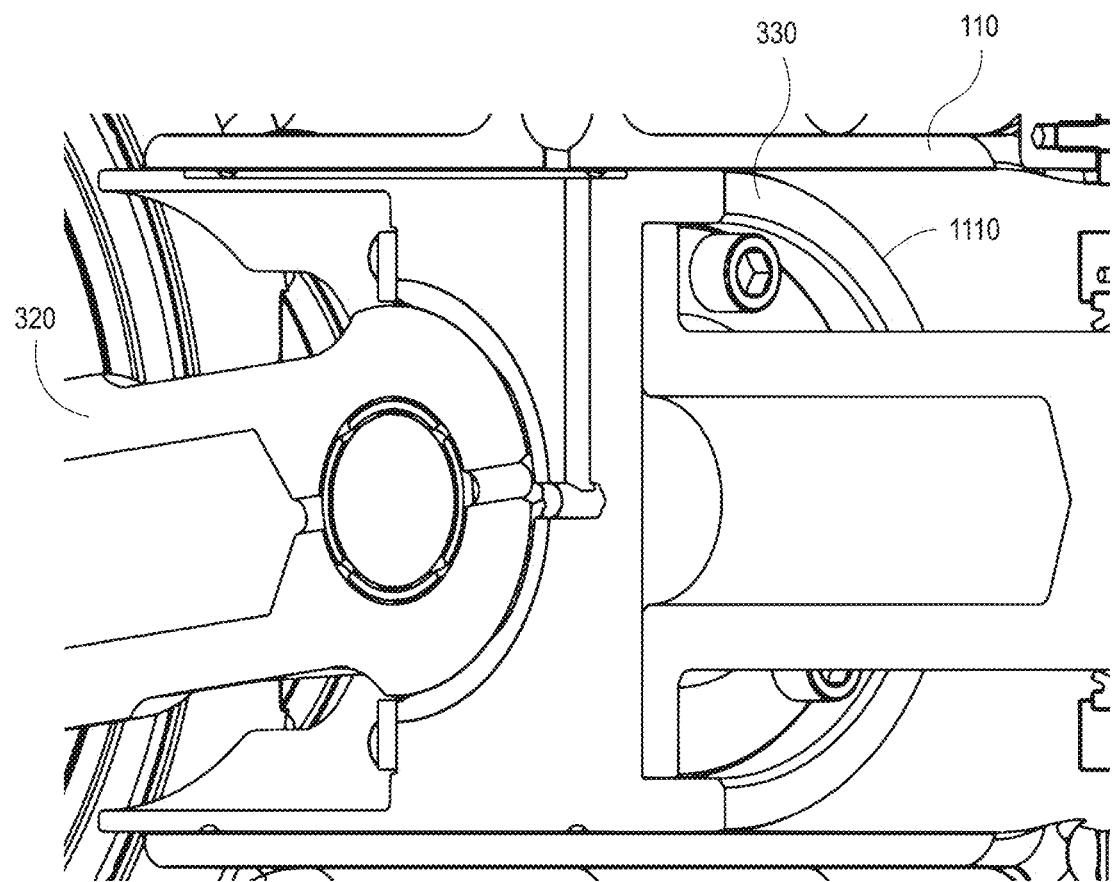
FIG. 11 illustrates a perspective view of a cross-section taken through the crosshead in the frame, according to an embodiment.

FIG. 11 illustrates a perspective view of the crosshead 330, according to an embodiment. The frame 110 may include a coating 1110. The coating 1110 may be applied to an inner surface of the frame 110 and/or an outer surface of the moving components (e.g., the crosshead 330) such that the coating 1110 is positioned between the frame 110 and the moving components therein. In an example, the coating 1110 may be or include an aluminum bronze material that is thermally sprayed and then worked to a smooth finish. The coating 1110 may have a thickness from about 100 μm to about 500 μm, about 500 μm to about 1 mm, or about 1 mm to about 3 mm. The coating 1110 may provide separation, lubrication, and insulation between the frame 110 and the moving components (e.g., the crosshead 330) and thus reduce the wear experienced by the frame 110 and/or the moving components.

As a result, the power end 100 may not include a liner or sleeve, which is found in conventional power ends. The liner or sleeve is a solid piece that is made of bronze or similar materials and is pressed into the frame. Because the liner or sleeve is a separate piece, it is typically much thicker than what is needed for protection of frame and the components. For example, the liner or sleeve may have a thickness greater than about 1 mm, greater than about 3 mm, greater than about 5 mm, or greater than about 10 mm. In addition, the application of the liner or sleeve typically involves a freezing process to shrink the liner or sleeve so that it may be pressed into the frame 110. Applying the coating 1110 to the frame 110 and/or moving components therein, and thus being able to omit the liner or sleeve, may reduce the complexity of the assembly and make serviceability easier. Additionally, it may make the assembly process safer by avoiding the freezing process.

Figure 12A:
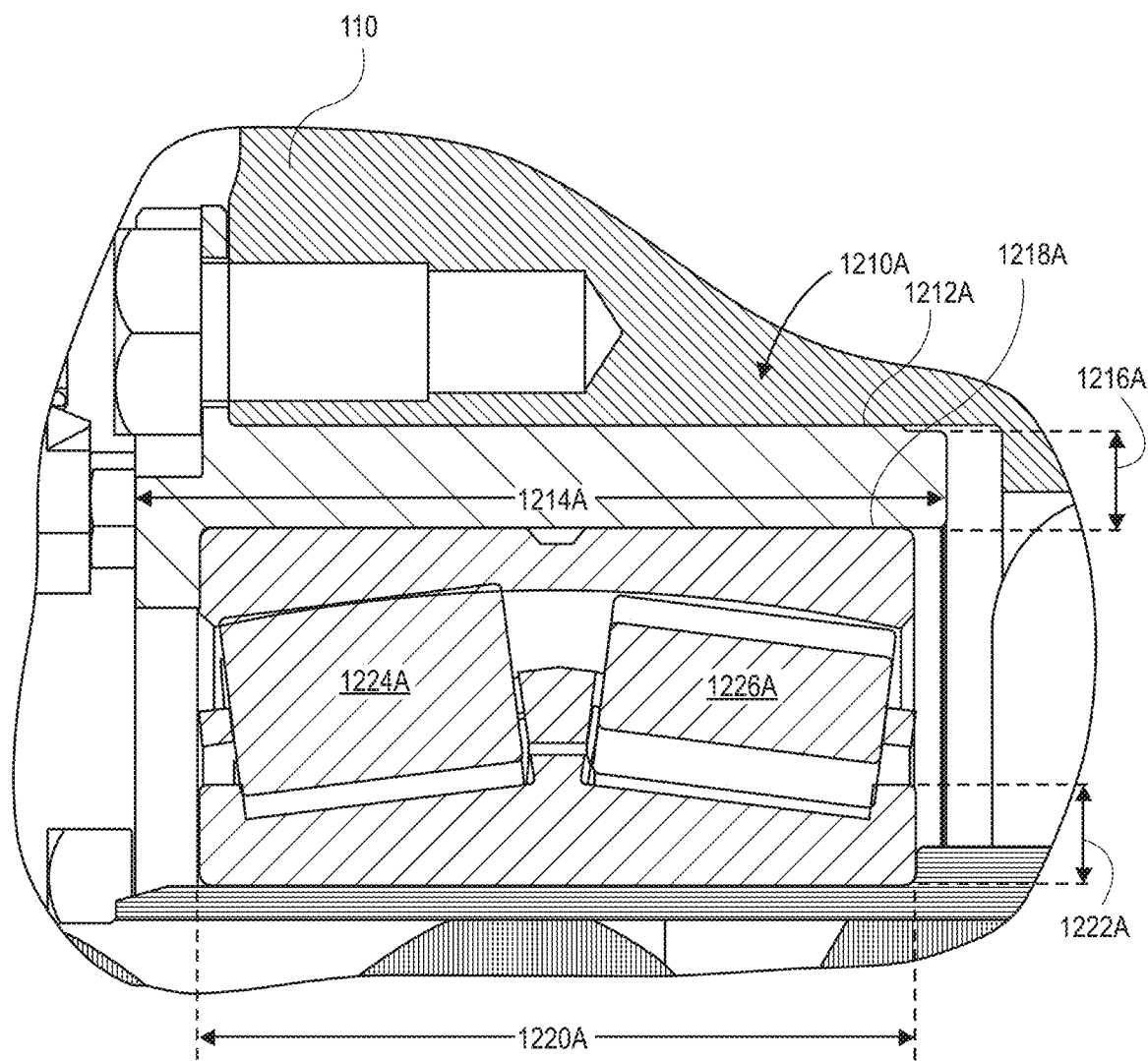
FIG. 12A illustrates a cross-sectional view taken through line 12-12 in FIG. 3 showing a bearing assembly, according to an embodiment.

FIG. 12A illustrates a cross-sectional view showing a bearing assembly 1210A, according to an embodiment. FIG. 12A is taken through line 12-12 in FIG. 3. The power end 100 may include one or more bearing assemblies (one is shown: 1210A). The bearing assembly 1210A may be positioned at least partially within the frame 110 and configured to support a moving (e.g., rotating) component. In the example shown in FIG. 12A, the bearing assembly 1210A is configured to support the input drive shaft 120 (see FIGS. 1 and 2). The bearing assembly 1210A may include a bearing housing 1212A and a bearing 1218A positioned at least partially therein. The bearing housing 1212A may have a size (e.g., length 1214A and/or thickness 1216A) that is configured to fit within the frame 110. The bearing 1218A may have a size (e.g., length 1220A and/or thickness 1222A) that is configured to fit within the bearing housing 1212A (e.g., via an interference fit). The bearing 1218A may include one or more bearing elements (two are shown: 1224A, 1226A) positioned at least partially therein.

Figure 12B:
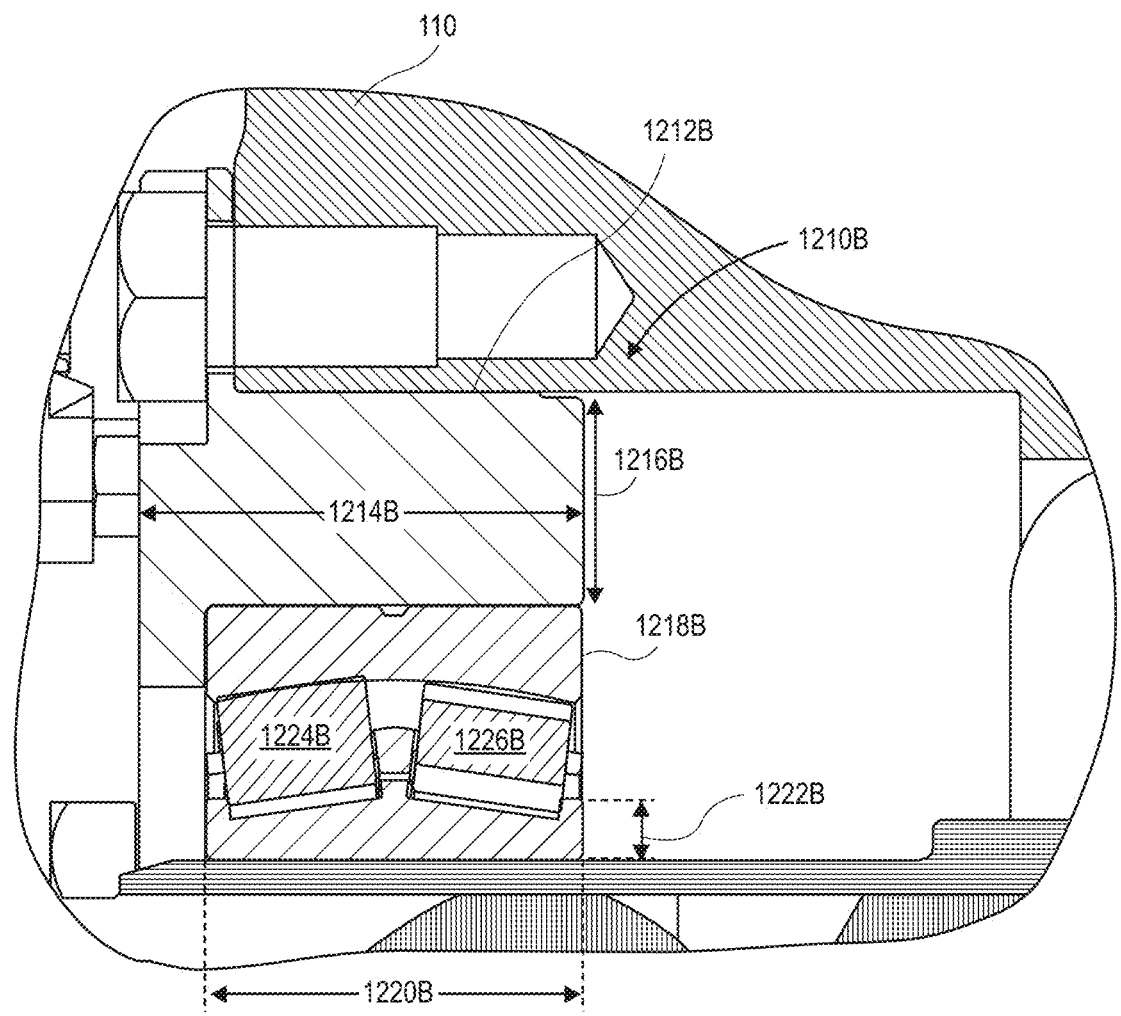
FIG. 12B illustrates the same view as FIG. 12A, but with a smaller bearing assembly, according to an embodiment.

In at least one embodiment, the frame 110 may be configured to receive/accommodate different bearing assemblies 1210A having different sizes. For example, FIG. 12B illustrates the same view as FIG. 12A, but with a smaller bearing assembly 1210B. As shown in FIG. 12B, the bearing housing 1212B of the bearing assembly 1210B may have a different (e.g., lesser) length 1214B and/or a different (e.g., greater) thickness 1216B to accommodate the differently sized bearing 1218B. The bearing 1218B may have a different (e.g., lesser) length 1220B and/or a different (e.g., greater) thickness 1222B to accommodate the differently sized (e.g., smaller) bearing elements 1224B, 1226B).

The ability to receive/accommodate bearing assemblies 1210A, 1210B of different sizes may allow a user to select the bearing assembly 1210A, 1210B that will optimally distribute the load transferred to the frame 110, which may reduce the stress imparted to the frame 110. Conventional frames have a fixed width of support that is limited by the thickness of the plates and the manufacturing process to be able to distribute the load into the area. If a larger bearing assembly were to instead be used, the loading would not adequately (e.g., evenly) be distributed into the frame, resulting in increased stress levels in the frame. Thus, the single-piece cast frame 110 described herein may be configured to receive the full load of a bearing of any size, and the load can be distributed more evenly into the frame 110.

Figure 13:
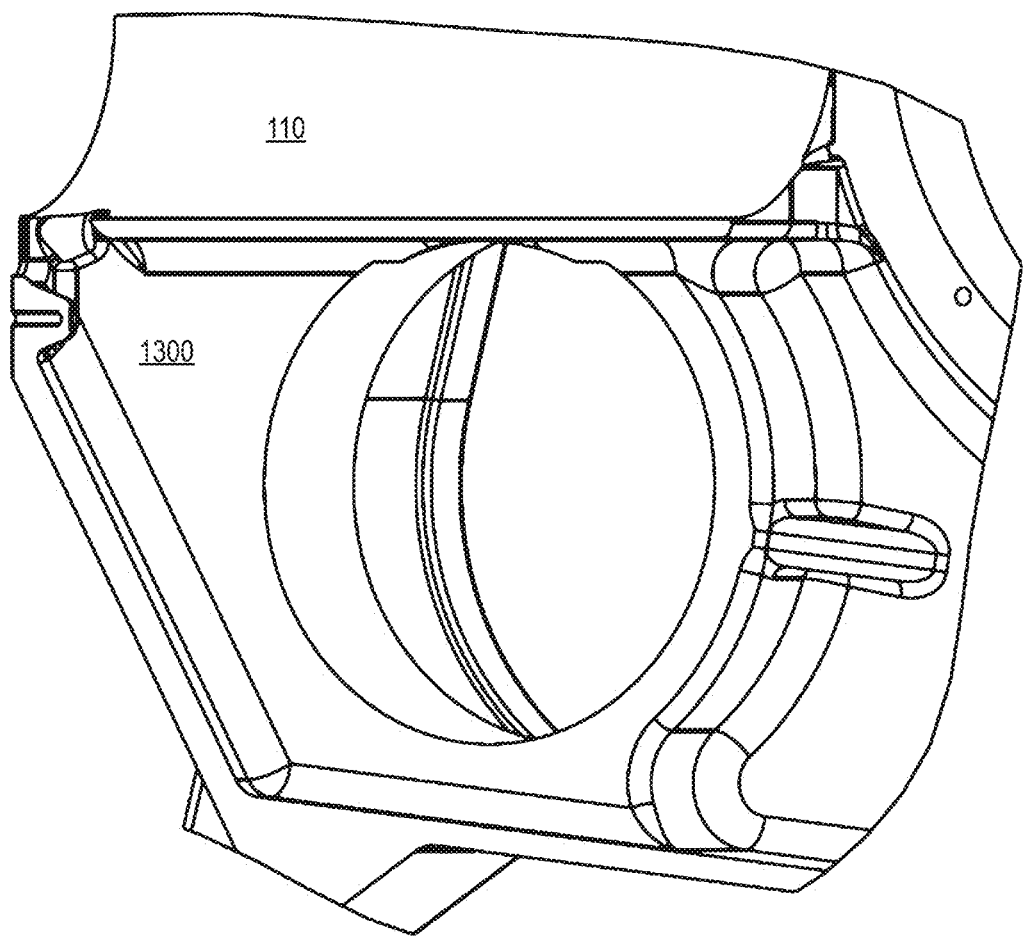
FIG. 13 illustrates a cross-sectional perspective view taken through line 13-13 in FIG. 2 showing a bearing support, according to an embodiment.

FIG. 13 illustrates a cross-sectional perspective view of another bearing support 1300 in the frame 110, according to an embodiment. The bearing support 1300 may be part of (e.g., integral with) the single-piece cast frame 110. In contrast, conventional welded frames include a bearing ring that is welded to a plate. By having the bearing support 1300 be integral with the frame 110, the bearing support 1300 may include more material that better distributes the forces and stress into the frame 110.

Figure 14:
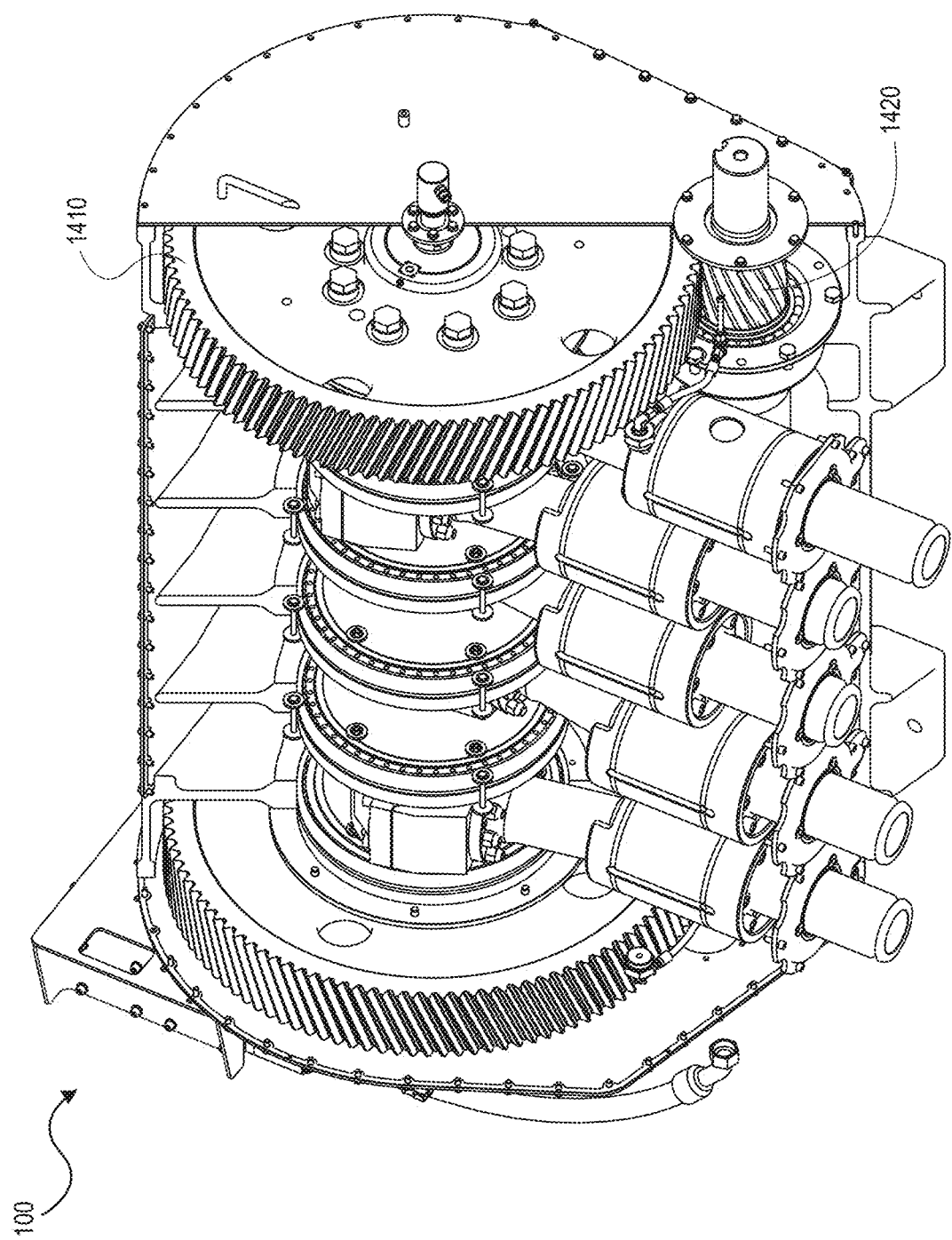
FIG. 14 illustrates a perspective view of the power end with a portion of the frame removed to show integrated gears therein, according to an embodiment.

FIG. 14 illustrates a perspective view of the power end 100 with a portion of the frame 110 removed to show integrated gears therein, according to an embodiment. The gears may be or include a bull gear 1410 and a pinion 1420 with opposed helical gears. In other embodiments, the gears may include a planetary set (not shown) or a series of gears to achieve a torque multiplier. In one embodiment, the gears may be integrated into the frame 110 by encompassing the full gear set within the frame 110. This means that the gears, bearings, lubrication, shafts, etc. are all a part of or fully or partially assembled into the frame 110. Integrating the gears into the frame 110 may increase the bearing support strength and may also reduce the weight and size of the power end 100. Integrating the gears into the frame 110 may also allow the use of a single lubrication system to lubricate all the moving components and the gears. In another embodiment, the gears and relative components may be partially integrated into the frame 110. In contrast, some conventional welded frames may have a bolted on gear set (e.g. planetary) which may have its own housing, bearings, shafts and lubrication path. These conventional welded frames may have increased weight and size of the power end.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A frame, comprising:
    an outer wall;
    a plurality of supports positioned at least partially within the outer wall, wherein the supports are configured to surround at least a portion of a shaft;
    a plurality of ribs positioned at least partially between the outer wall and the supports;
    a plurality of crosshead tubes positioned at least partially within the outer wall; and
    a lube rail positioned at least partially within the outer wall and defining an opening wherein the lube rail extends between the crosshead tubes, and wherein the lube rail is configured to provide lubricant to the crosshead tubes,
    wherein the outer wall, the supports, the ribs, the crosshead tubes, and the lube rail are cast together in a mold.

2. The frame of claim 1, further comprising a nose plate, wherein the crosshead tubes are positioned at least partially between the supports and the nose plate, and wherein the outer wall, the supports, the ribs, the crosshead tubes, the lube rail, and the nose plate are cast together in the mold.

3. The frame of claim 2, wherein a radius exists between one of the ribs and the nose plate, and wherein the radius is from about 0.1 inches to about 3.0 inches.

4. The frame of claim 2, wherein the nose plate varies in thickness.

5. The frame of claim 2, wherein the nose plate comprises a first portion and a second portion, wherein the first portion is thicker than the second portion, wherein the first portion has a thickness from about 1.0 inch to about 12.0 inches, wherein the second portion has a thickness from about 0.25 inches to about 3.0 inches, wherein the first portion is integral with the second portion and the ribs, and wherein a plane through the first portion is aligned with the ribs and a plane through the second portion is misaligned with the ribs.

6. The frame of claim 5, wherein the nose plate comprises an extrusion for a threaded hole, wherein the extrusion has a thickness from about 0.25 inches to about 3.0 inches, and wherein the extrusion is positioned closer to the second portion than the first portion.

7. The frame of claim 5, wherein a plane through the second portion is aligned with the supports and a plane through the first portion is misaligned with the supports.

8. The frame of claim 1, wherein a radius exists between one of the ribs and one of the crosshead tubes, and wherein the radius is from about 0.1 inches to about 3.0 inches.

9. The frame of claim 1, wherein each of the ribs comprises a first portion and a second portion, wherein the first portion is thicker than the second portion, wherein the first portion has a thickness from about 2.5 inches to about 8.0 inches, and wherein the second portion has a thickness from about 0.5 inches to about 5.0 inches.

10. The frame of claim 9, wherein the first portion is positioned farther from the lube rail than the second portion.

11. A single-piece cast frame, comprising:
    an outer wall;
    a plurality of bearing supports positioned at least partially within the outer wall, wherein the bearing supports are configured to surround at least a portion of a shaft;
    a plurality of ribs positioned at least partially between the outer wall and the bearing supports, wherein the ribs have a varying thickness;
    a plurality of crosshead tubes positioned at least partially within the outer wall, wherein a first radius exists between a first of the ribs and a first of the crosshead tubes, and wherein the first radius is from about 0.1 inches to about 3.0 inches;
    a lube rail positioned at least partially within the outer wall and defining an opening through the ribs, wherein the lube rail extends between the crosshead tubes, and wherein the lube rail is configured to provide lubricant to the crosshead tubes; and
    a nose plate, wherein the crosshead tubes are positioned at least partially between the bearing supports and the nose plate, wherein the nose plate varies in thickness, wherein a second radius exists between the first rib and the nose plate, and wherein the second radius is from about 0.1 inches to about 3.0 inches,
    wherein the outer wall, the bearing supports, the ribs, the crosshead tubes, the lube rail, and the nose plate are cast together in a mold to form the single-piece cast frame.

12. The frame of claim 11, wherein the first rib comprises a first portion and a second portion, wherein the first portion is thicker than the second portion, wherein the first portion has a thickness from about 2.5 inches to about 8.0 inches, wherein the second portion has a thickness from about 0.25 inches to about 5.0 inches, and wherein the second portion is integral with and between the lube rail and the first portion.

13. The frame of claim 11, wherein the nose plate comprises a first portion and a second portion, wherein the first portion is thicker than the second portion, wherein the first portion has a thickness from about 1.0 inch to about 12.0 inches, wherein the second portion has a thickness from about 0.25 inches to about 3.0 inches, wherein the first portion is integral with the second portion and the first rib, wherein a plane through the first portion is aligned with the first rib, and wherein a plane through the second portion is not aligned with the first rib.

14. The frame of claim 13, wherein the nose plate comprises an extrusion for a threaded hole, wherein the extrusion has a thickness from about 0.25 inches to about 3.0 inches, and wherein the extrusion is positioned closer to the second portion than the first portion.

15. A single-piece cast frame for a power end of a pump, the frame comprising:
- an outer wall;
- a plurality of crankshaft bearing supports positioned at least partially within the outer wall, wherein the crankshaft bearing supports are configured to surround at least a portion of a shaft;
- a plurality of ribs positioned at least partially between the outer wall and the crankshaft bearing supports, wherein a first radius is defined between a first of the crankshaft bearing supports and a first of the ribs, wherein the first radius is from about 0.5 inches to about 20 inches, wherein the first rib comprises a first portion and a second portion, wherein the first portion of the first rib is thicker than the second portion of the first rib, wherein the first portion of the first rib has a thickness from about 2.5 inches to about 8.0 inches, wherein the second portion of the first rib has a thickness from about 0.5 inches to about 5.0 inches;
- a plurality of crosshead tubes positioned at least partially within the outer wall and at least partially radially-outward from the crankshaft bearing supports, wherein a first axial end of a first of the crosshead tubes is positioned proximate to the crankshaft bearing supports, wherein a second radius is defined between the first rib and the first crosshead tube, and wherein the second radius is from about 0.1 inches to about 3.0 inches;
- a lube rail positioned at least partially within the outer wall and defining an opening through the ribs, wherein the lube rail extends between the crosshead tubes, wherein the lube rail is configured to provide lubricant to the crosshead tubes, and wherein the second portion of the ribs is integral with and between the first portion of the ribs and the lube rail; and
- a nose plate positioned proximate to a second axial end of the first crosshead tube, wherein a third radius is defined between the first rib and the nose plate, and wherein the third radius is from about 0.1 inches to about 3.0 inches, wherein the nose plate comprises a first portion and a second portion, wherein the first portion of the nose plate is thicker than the second portion of the nose plate, wherein the first portion of the nose plate has a thickness from about 1.0 inch to about 12.0 inches, wherein the second portion of the nose plate has a thickness from about 0.25 inches to about 3.0 inches, wherein the first portion of the nose plate is integral with the second portion of the nose plate and the first rib, wherein a plane through the first portion of the nose plate is aligned with the first rib, and wherein a plane through the second portion of the nose plate is not aligned with the first rib,
- wherein the outer wall, the crankshaft bearing supports, the ribs, the crosshead tubes, the lube rail, and the nose plate are cast together in a mold, and wherein none of the crankshaft bearing supports, the ribs, the crosshead tubes, the lube rail, and the nose plate are fastened or welded together.

16. The frame of claim 15, further comprising a stay rod that is configured to couple the power end of the pump to a fluid end of the pump, wherein the stay rod is configured to extend into the frame proximate to the nose plate and the ribs, and wherein, during operation of the power end of the pump, a maximum stress proximate to a top and a bottom of the nose plate and the ribs, where the stay rod extends into the frame, is less than about 80 MPa.

17. The frame of claim 15, wherein during operation of the power end of the pump, a maximum stress proximate to the third radius is less than about 80 MPa.

18. The frame of claim 15, further comprising a gear set configured to act upon the frame.

* * * * *